United States Patent [19]
Uthoff

[11] Patent Number: 5,484,211
[45] Date of Patent: Jan. 16, 1996

[54] SELF-ALIGNING FLANGED BEARING

[76] Inventor: Robert D. Uthoff, 18 Claraned Hts., St. Louis, Mo. 63026

[21] Appl. No.: 323,009

[22] Filed: Oct. 14, 1994

[51] Int. Cl.⁶ .................................................. F16C 23/04
[52] U.S. Cl. ........................ 384/192; 384/203; 384/211
[58] Field of Search ............................ 384/192, 202–212

[56] References Cited

U.S. PATENT DOCUMENTS

| | | | |
|---|---|---|---|
| 1,873,086 | 8/1932 | Watts | 384/203 |
| 1,946,086 | 2/1934 | Lyman | 384/203 |
| 2,462,011 | 2/1949 | Thiry | 384/220 |
| 3,298,754 | 1/1967 | Riester | 384/203 |
| 3,383,129 | 5/1968 | Ulderup | 384/203 X |
| 3,604,765 | 9/1971 | Babcock | 384/220 X |
| 3,942,403 | 3/1976 | Pramberger | 384/202 X |
| 4,251,122 | 2/1981 | McCloskey | 384/192 |
| 4,747,810 | 5/1988 | Shepley et al. | 384/192 X |
| 4,790,672 | 12/1988 | Komplin | 384/125 |
| 4,986,675 | 1/1991 | Dye et al. | 384/192 |
| 5,273,369 | 12/1993 | Strobl | 384/192 X |

FOREIGN PATENT DOCUMENTS

| | | | |
|---|---|---|---|
| 3332323 | 3/1985 | Germany | 384/192 |
| 2143595 | 2/1985 | United Kingdom | 384/192 |

*Primary Examiner*—Thomas R. Hannon
*Attorney, Agent, or Firm*—Kalish & Gilster

[57] ABSTRACT

A one-piece, self-aligning bearing is disclosed which includes a cylindrical bearing sleeve of uniform thickness having an outwardly convex hemispherical flange projecting from a first end of the sleeve and arching longitudinally toward an opposite second end of the sleeve, the flange being of uniform wall thickness.

9 Claims, 2 Drawing Sheets

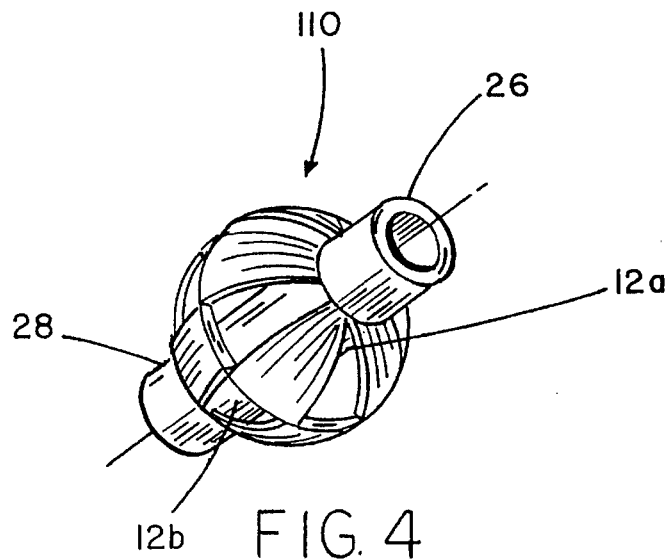
FIG. 4
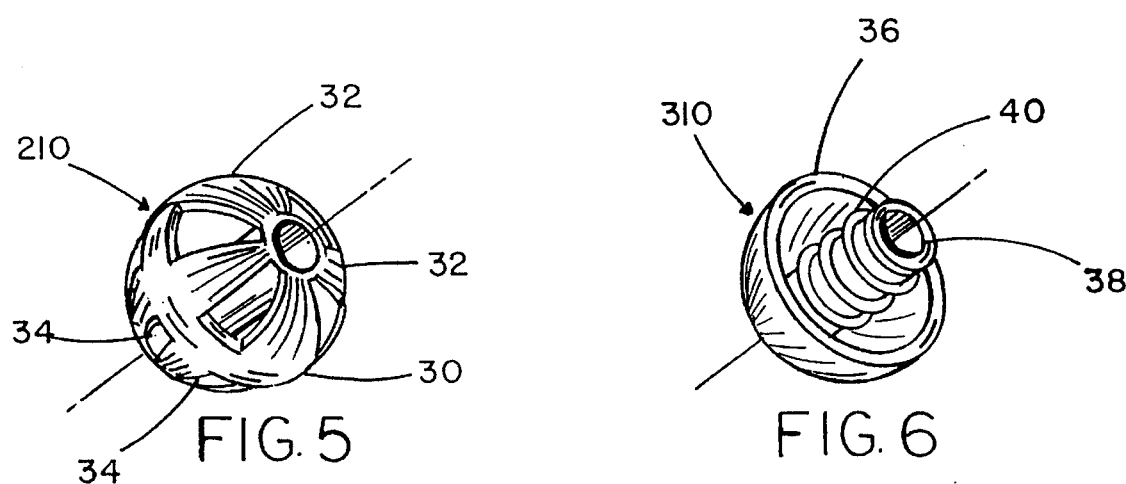
FIG. 5
FIG. 6
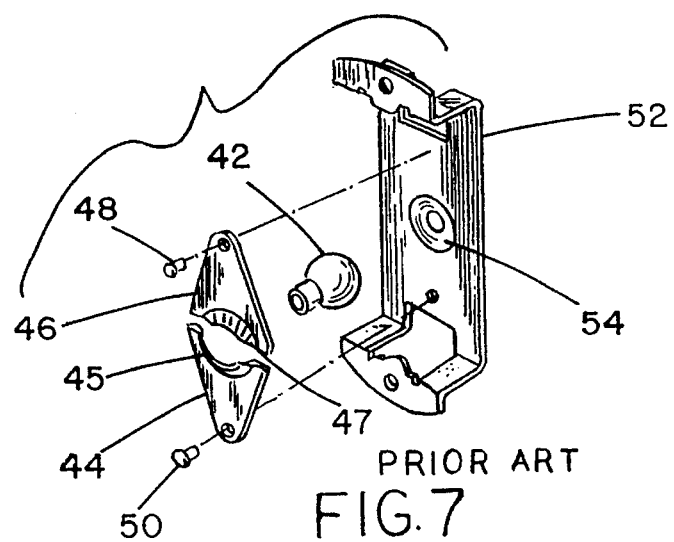
PRIOR ART
FIG. 7

SELF-ALIGNING FLANGED BEARING

BACKGROUND AND SUMMARY OF THE INVENTION

This invention relates to an improved self-aligning bearing.

Self-aligning bearings for rotary shafts are known which have a convex spherical inner member or "ball" disposed within a matching concave outer member or "ball socket". The ball typically has a central cylindrical bore which provides a bearing surface for the rotary shaft. Such bearings typically have a solid ball with a continuous outer surface. The ball in such applications is typically die cast, sintered or machined. If a higher quality material such as a self-lubricating material is desired, then a sleeve of such material is inserted into the solid ball. This results in a multi-part bearing which is expensive to manufacture and expensive to buy.

Self-aligning bearings allow for less expensive brackets or other supporting structure to be used for the support of rotating motor shafts. Parts made to less demanding tolerances are cheaper to make and can be assembled with somewhat less care and precision with satisfactory results. For most motor shafts, it is absolutely imperative that the internal diameter of the bearing line up with its mate or there will be a bind on the rotating shaft resulting in poor performance.

Prior designs have not been able to accomplish this with a bearing that can be produced in a die that has only two parts or which does not cause an irregular surface on the bore of the bearing called "sink marks".

These sink marks are the result of intersecting mold walls. Thus, for example, bearings have been molded with radial fins but the internal diameter is marred by these sink marks, thus destroying the smoothness of the internal diameter or bearing surface. There is thus a need for an inexpensive, self-aligning bearing which has a uniform, self-lubricating inner bearing surface.

Accordingly, it is among the several objects of the present invention to provide a low cost bearing which can be accurately and rapidly molded in a relatively inexpensive, single action, two-piece mold.

It is also an object of the present invention to design a bearing which is self-aligning and yet can be produced in a two-part mold with no side cores, no abnormally thick sections, and no internal diameter irregularities such as sink marks or the like.

It is a further object of the invention to provide a relatively long-lasting bearing.

These needs are satisfied by the present invention which provides an inexpensive one-piece plastic self-aligning bearing which includes a cylindrical bearing sleeve of uniform thickness having an outwardly convex hemispherical flange projecting from a first end of the sleeve and arching longitudinally toward an opposite second end of the sleeve, the flange being of uniform wall thickness.

The bearing sleeve preferably has an outwardly concave hemispherical flange at each end to produce a hollow spherical outer wall with two hemispherical portions, a center of one portion being attached to a first end of the inner wall and a center of the other portion being attached to the opposite end of the inner wall. The outer rim of each hemispherical flange is preferably connected to the outer rim of the other hemispherical flange to provide increased strength and rigidity to the outer wall portion. The hemispherical portions preferably have a plurality of axially tapered segments separated by axially tapered spaces of equal size to facilitate one-piece injection molding of the entire bearing. The wall portions are preferably of uniform thickness.

Other objects will be in part apparent and in part pointed out hereinbelow.

BRIEF DESCRIPTION OF THE DRAWINGS

The invention will be better understood by referring to the accompany drawings, in which:

FIG. 4 is a perspective view of a second embodiment of the bearing of the invention;

FIG. 5 is a perspective view of a third embodiment of the bearing of the invention;

FIG. 6 is a perspective view of a fourth embodiment of the bearing of the invention; and FIG. 7 is an exploded perspective view of a prior art self-aligning bearing assembly using a spherical bearing.

Throughout the drawings, like parts are indicated by like element numbers.

DESCRIPTION OF PREFERRED EMBODIMENTS

Figure 1:
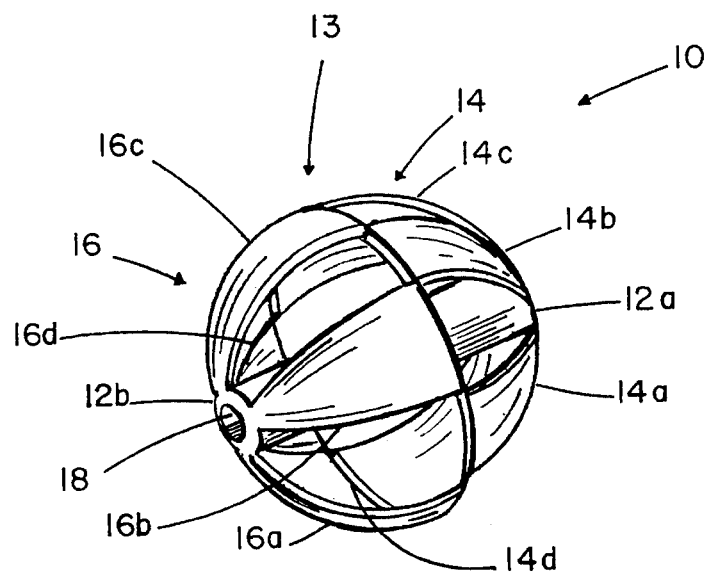
FIG. 1 is a perspective view of the preferred embodiment of the bearing of the invention.
Figure 2:
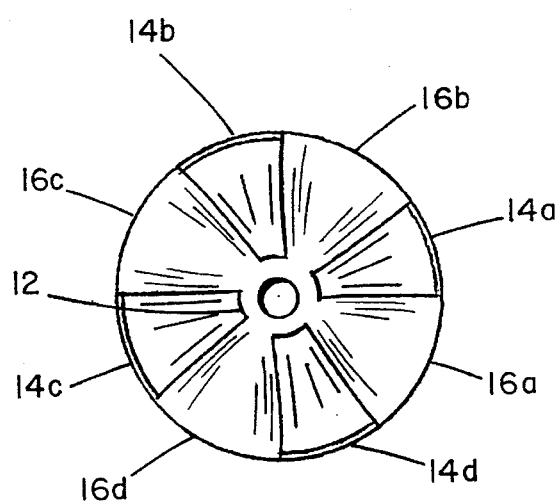
FIG. 2 is an end elevational view of the bearing of FIG. 1.
Figure 3:
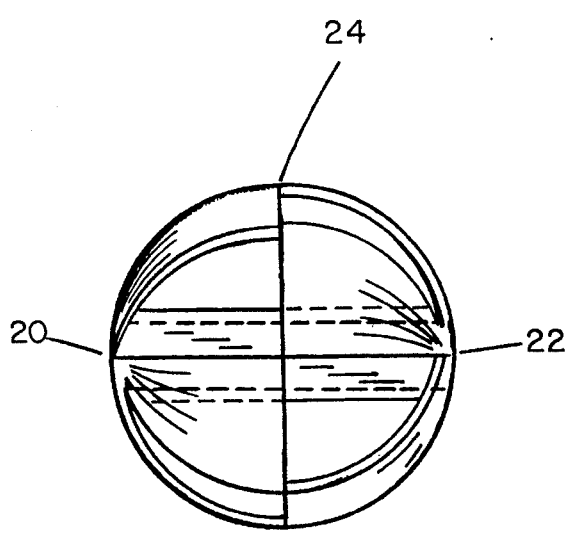
FIG. 3 is a side elevational view of the bearing of FIGS. 1 and 2.

Referring to FIGS. 1–3, a first embodiment of the self-aligning bearing of the invention is shown. The bearing 10 has a cylindrical tubular inner wall 12 and a spherical outer wall 13. The inner wall portion 12 defines a uniform continuous cylindrical inner bearing surface 18 extending diametrically through the bearing. The outer wall 13 includes two hemispherical portions 14 and 16, each being an outwardly convex hemispherical flange projecting from and integrally attached at its center to one of the opposite ends 12a and 12b of wall 12 and being integrally attached to each other at their rim to form a hollow spherical ball. The overall appearance is thus a hollow ball with a cylindrical tube extending diametrically through the ball from one side to the other. However, the outer wall is not continuous, but rather is divided into spaced petals as described below to facilitate molding.

The hemispherical portions are not continuous since each portion has four petals 14a, 14b, 14c, 14d and 16a, 16b, 16c, 16d, respectively, with a space between each of the petals, for a total of eight petals. Although eight petals are shown, the total number of petals can be any even number, with an equal number of petals in each outer wall portion 14, 16. As best seen in FIG. 2, the space between each of the four petals of the first outer wall portion 14 is the same size as one of the petals of the second wall portion, and the petals of each portion are offset or staggered with respect to the petals of the other wall portion. This is necessary to allow the inner surface of each petal to be formed by a mold projection which passes through the space between the petals of the opposite outer wall portion.

The bearing shown in FIGS. 1–3 has eight identical alternating petals and spaces, each extending over a transverse circumferential arc of 45 degrees and a longitudinal arc of approximately 90 degrees. As previously pointed out, there can be any even number of petals. The petals have a flared appearance due to the increase in diameter of the outer wall from its ends 20,22 to its midpoint 24. Each portion 14, 16 of the outer wall 13 has four of the petals separated from each other by the four spaces. The petals of each hemispherical outer wall portion are axially aligned with the spaces between the petals of the other hemispherical outer wall portion and are integrally attached to the petals of the other outer wall portion for structural strength. The attachment is, for illustrative purposes, shown in FIGS. 1–3 as being merely connected at outer corners of the petals, but would preferably be more rigidly made by addition of a belly band as shown in FIG. 5.

FIG. 4 shows a bearing 110 like that of FIGS. 1–3 except that a tubular extension 26, 28 is added to each end 12a, 12b, respectively, of the central wall portion 12 to provide increased bearing surface. It will be understood that an extension could be added to only one of the ends 12a, 12b, if desired.

FIG. 5 also shows a bearing 210 like that of FIGS. 1–3 (10), in all respects, except that a cylindrical belly band 30 is added between the outer ends of the petals 32 for added structural strength. This belly band 30 has a continuous right cylindrical inner surface ring to allow for simplified molding of the petals. The edges of the belly band may be tapered or "feathered" outwardly as a result of the molding process, but such feathering will not affect the function of the bearing because it does not change the smooothness of the interior diameter thereof.

FIG. 6 shows a bearing 310 in some respects similar to bearing 10 but varying in that the outer wall only includes one hemispherical portion 36 attached to one end of an inner wall portion 38. Bearing 310 is also a one-piece, self-aligning bearing having a hemispherical outer bearing wall portion 36 and a tubular central inner wall portion 38 having an inner cylindrical bearing surface extending longitudinally therethrough and having a first end integrally attached to a center of hemispherical wall 36 and projecting coaxially inwardly along the central axis of the outer wall, both wall portions being made of injection molded plastic of uniform wall thickness. In use, the bearing 310 is held in position in a matching concave socket of the usual type by a resilient coil spring 40 lying about inner wall portion 38. Hemispherical outer wall portion 36 is preferably a continuous wall of the same thickness as the thickness of the inner wall portion 38.

The self-aligning bearing of the invention is intended to be retained in a concave socket and FIG. 7 is included to show one example of a typical concave socket and a conventional spherical, self-aligning bearing 42 therein. Bearing 42 is ordinarily held between the sockets 45 and 47 of two retention plates 44 and 46 on the left of the figure and the socket 54 of a retention frame 52 on the right.

Thus in FIGS. 1–6 there are shown four embodiments 10, 110, 210, and 310 of a one-piece, self-aligning bearing which includes a cylindrical bearing sleeve of uniform thickness having an outwardly convex hemispherical flange projecting from a first end of the sleeve and arching longitudinally toward an opposite second end of the sleeve, the flange being of uniform wall thickness and being outwardly spaced from all portions of the bearing sleeve between the first and second ends. In each case, the bearing and sleeve are made of plastic and in FIG. 6, bearing 310, the hemispherical flange 36 is continuous, rather than petaled (or "fingered") as in the first three embodiments.

In FIGS. 1–5, the flange comprises a plurality of longitudinally extending segments (petals) separated by longitudinal spaces and to form a hemisphere includes a second outwardly convex hemispherical flange projecting from the second end of the sleeve and arching longitudinally toward the first end of the sleeve, the flange being of uniform wall thickness and being outwardly spaced from all portions of the bearing sleeve between the first and second ends.

In FIGS. 1–5 the outer rims of the first and second flanges integrally mate to form a spherical outer shell surrounding and centrally spaced from the bearing sleeve between the first and second ends of the bearing. The second flange comprises a plurality of longitudinal spherical segments circumferentially separated by longitudinal spaces. Also, in FIGS. 1–5 the outer end portions of the segments of the first flange are circumferentially offset relative to the segments of the second flange and are axially aligned with the spaces between the segments of the second flange. In FIG. 5, the outer end portions of the hemispherical segments of the first flange overlap the outward ends of the hemispherical segments of the second flange and are laterally connected to the outward ends of the hemispherical segments of the second flange to form a continuous annular band or "belly band" spaced radially outward from a midpoint between the first and second ends of the bearing sleeve, to thereby give added structural strength of the outer wall portion.

The bearing of FIGS. 1–3 is molded in a simple single action two-piece injection mold without the need for any side cores. The mold (not shown) has a central cylindrical pin to define inner cylindrical bearing surface 18 and has four projections from each side, each of the projections having a concave cylindrical inner surface extending over an arc of 45 degrees to form one-eighth of the outer surface of the inner wall portion 12 and having a convex arcuate outer surface extending over an arc of 45 degrees to form the inner surface of one of the petals of the opposite side and having a concave arcuate inner surface extending over an arc of 45 degrees between the projections to define and form the outer surface of a petal of the adjacent side.

Likewise, the new bearings of FIGS. 4–6 can also be molded in a simple two-piece single action mold with appropriate modifications to the mold cavity to define the modified shapes.

For the bearing of FIG. 4 the mold requires a longer central pin and longer inner cylindrical concave projection surfaces to define a longer bearing sleeve.

For the bearing of FIG. 5, an extra annular recess is needed to provide the belly band. The belly band has a right cylindrical inner surface to allow the above-noted mold projections to pass thereunder during mold separation.

For the bearing of FIG. 6, the mold is greatly simplified in that a hemispherical concave surface with a projecting cylindrical core pin on one side and a hemispherical concave surface with a cylindrical recess coaxial to the core pin can be the operative mold cavity surfaces.

In order to achieve more uniform properties during molding of the bearing, it is desired to have the inner wall portion and the outer wall portion be of the same thickness. This allows more uniform cooling of the plastic during molding. The use of a hollow sphere and the offset petal design of this invention allows for such uniformity of wall thickness while still allowing the bearing to be molded in a simple single action, two-piece mold.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions as herein described and illustrated without departing from the scope of the invention, it is intended that all matter contained in the foregoing description or shown in the accompanying drawings shall be interpreted as illustrative rather than limiting.

What is claimed is:

1. A one-piece, self-aligning bearing, comprising:

a cylindrical bearing sleeve of uniform thickness having a first outwardly convex hemispherical flange projecting from a first end of the sleeve and arching longitudinally toward an opposite second end of the sleeve, the first flange being of uniform wall thickness and being outwardly spaced from all portions of the bearing sleeve between the first and second ends of the sleeve, wherein the first flange comprises a plurality of longitudinal spherical segments separated by longitudinal spaces, and further comprising a second outwardly convex hemispherical flange projecting from the second end of the sleeve and arching longitudinally toward the first end of the sleeve, the second flange being of uniform wall thickness and being outwardly spaced from all portions of the bearing sleeve between the first and second ends, wherein the outer rims of the first and second flanges integrally mate to form a spherical outer shell surrounding and spaced from the bearing sleeve between the first and second ends of the sleeve.

2. The bearing of claim 1, wherein the second flange comprises a plurality of longitudinal spherical segments circumferentially separated by longitudinal spaces.

3. The bearing of claim 1, wherein outer end portions of the segments of the first flange are circumferentially offset relative to the segments of the second flange and are axially aligned with the spaces between the segments of the second flange.

4. The bearing of claim 3, wherein the outer end portions of the spherical segments of the first flange overlap the outward ends of the spherical segments of the second flange and are laterally connected to the outward ends of the spherical segments of the second flange to form a continuous annular band spaced radially outward from a midpoint between the first and second ends of the bearing sleeve, to thereby give added structural strength of the outer wall portion.

5. The bearing of claim 1, wherein the bearing is made entirely of plastic.

6. The bearing of claim 1, and further comprising a tubular extension integrally formed with and attached coaxially to and projecting outwardly from the first end and having a cylindrical inner bearing surface, and a tubular extension integrally formed with and attached coaxially to and projecting outwardly from the second end of the sleeve and having a cylindrical inner bearing surface.

7. A one-piece, self-aligning bearing, comprising:

a hemispherical outer bearing wall having a convex inner surface; and a tubular central inner wall having an inner cylindrical bearing surface extending longitudinally therethrough and having a first end integrally attached to a center of the convex inner surface of said hemispherical outer wall and projecting coaxially along the central axis of the outer wall, to a point beyond the outer edge of said hemispherical outer wall, both wall portions being made of injection molded plastic of uniform wall thickness.

8. A one-piece, self-aligning bearing, comprising:

a tubular central inner wall portion defining a bearing sleeve having an inner cylindrical bearing surface extending longitudinally therethrough from a first end to a second end along a central axis; and a spherical outer wall portion, including a plurality of first outwardly concave spherical outer wall segments attached to said first end and projecting toward said second end;

a plurality of second outwardly concave spherical outer wall segments attached to said second end and projecting toward said first end;

the first wall segments being circumferentially separated by a circumferential distance which is equal to the circumferential width of an opposed second wall segment at the same distance from the central axis, further comprising a belly band connecting the first and second outer wall segments.

9. The bearing of claim 8 wherein the belly band has a right cylindrical inner surface.

* * * * *